United States Patent
Fuji

(10) Patent No.: US 10,654,508 B2
(45) Date of Patent: May 19, 2020

(54) STEERING WHEEL DECORATIVE MEMBER

(71) Applicant: KABUSHIKI KAISHA TOKAI RIKA DENKI SEISAKUSHO, Aichi (JP)

(72) Inventor: Takahiro Fuji, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 391 days.

(21) Appl. No.: 15/660,170

(22) Filed: Jul. 26, 2017

(65) Prior Publication Data
US 2018/0043920 A1   Feb. 15, 2018

(30) Foreign Application Priority Data
Aug. 12, 2016 (JP) ................. 2016-158931

(51) Int. Cl.
| H05B 3/16 | (2006.01) |
| B62D 1/06 | (2006.01) |
| B62D 1/04 | (2006.01) |

(52) U.S. Cl.
CPC ............... B62D 1/065 (2013.01); B62D 1/04 (2013.01); H05B 3/16 (2013.01)

(58) Field of Classification Search
CPC .. H05B 1/0236; H05B 3/34; H05B 2203/003; H05B 2203/005; H05B 2203/007; H05B 2203/011; H05B 2203/014; H05B 2203/017; B62D 1/06; B62D 1/065
See application file for complete search history.

(56) References Cited

U.S. PATENT DOCUMENTS

| 6,707,006 B1 * | 3/2004 | Myers ................. B62D 1/065 |
| | | 219/204 |
| 2006/0118538 A1 | 6/2006 | Jones et al. |
| 2015/0197272 A1 * | 7/2015 | Nonoyama ............ B62D 1/065 |
| | | 74/552 |

FOREIGN PATENT DOCUMENTS

| DE | 10027046 A1 | 12/2001 |
| JP | 62-114872 U | 7/1987 |
| JP | 2010-036840 A | 2/2010 |

OTHER PUBLICATIONS

Extended European Search Report issued in the corresponding EP application No. 17184661.1 dated Jan. 31, 2018.
Office Action issued in the corresponding JP application No. 2016-158931 dated Dec. 17, 2019.

* cited by examiner

*Primary Examiner* — Brian W Jennison
(74) *Attorney, Agent, or Firm* — Roberts Calderon Safran & Cole P.C.

(57) ABSTRACT

A steering wheel decorative member that is configured to be attached corresponding to a resin member covering a periphery of a ring core of a steering wheel. The decorative member includes a base member constituting a design part, a heater provided on a back surface of the base member and an attachment part that is configured to attach the base member to the resin member. The attachment part is configured so as to electrically connect a terminal of the heater to a power supply side terminal provided in the resin member.

8 Claims, 6 Drawing Sheets

STEERING WHEEL DECORATIVE MEMBER

The present application is based on Japanese patent application No. 2016-158931 filed on Aug. 12, 2016, the entire contents of which are incorporated herein by reference.

BACKGROUND

Technical Field

The present invention relates to a steering wheel decorative member that enhances the aesthetics of the surface of a steering wheel, and particularly relates to a steering wheel decorative member that attaches to a ring portion of a steering wheel.

Related Art

JP 2010-036840A, filed previously by the present applicant, discloses an example of a steering wheel that has an enhanced appearance.

The steering wheel described in JP 2010-036840A includes a rim core member that is annular in shape and is covered by a resin molded body made from rigid urethane foam. The rim core member includes a section covered by a pair of wood members made from thin boards that have roughly a semicircular arc shape, and a section covered by an outer leather member.

An edge portion of the outer leather member is a folded end portion obtained by folding the edge portion at substantially a right angle to the rim core member side, and a gap for graining the folded end portion of the outer leather member is provided between opposing surfaces of the wood members and the outer leather member.

A heater is adhered to an inner surface of each of the wood members, and electrode terminals having different polarities are provided at both end portions in the extending direction of the heater. End portions of a wire passing through the gap provided between the opposing surfaces of the wood members and the outer leather member are connected to the electrode terminals of the heater. The wire is inserted into an insulating wire cover that is fixed to the core of the rim core member, extends to the vehicle side, and is electrically connected to a controller.

SUMMARY

According to the related art, wiring work when connecting the heater is more labor intensive because routing the wires when assembling the wood members on the rim core member is difficult.

Accordingly, an object of the invention is to provide a steering wheel decorative member with excellent ease of assembly and ease of wiring work.

An aspect of the invention is a steering wheel decorative member that is attached corresponding to a resin member covering a periphery of a ring core of a steering wheel. According to this aspect, the decorative member includes a base member constituting a design part, a heater provided on a back surface of the base member, and an attachment part attaching the base member to the resin member. In such a steering wheel decorative member, the attachment part is configured as an electrical connector that electrically connects a terminal of the heater to a power supply side terminal provided in the resin member.

In the steering wheel decorative member according to the invention, the attachment part may be configured as an engaging fixing piece of which a first end side is electrically connected to the terminal of the heater and a second end side protrudes from the back surface of the base member and is electrically connected to the power supply side terminal.

In the steering wheel decorative member according to the invention, the engaging fixing piece may be made from an electrically conductive material.

In the steering wheel decorative member according to the invention, the power supply side terminal may be provided in an attachment opening into which the attachment part is inserted and pushed into.

According to an aspect of the invention, ease of assembly when assembling the decorative member and ease of wiring work when connecting the heater can be enhanced.

DESCRIPTION OF EMBODIMENTS

Preferred embodiments of the invention will be described in detail hereinafter with reference to the appended drawings.

First Embodiment

Configuration of Steering Wheel

Figure 1:
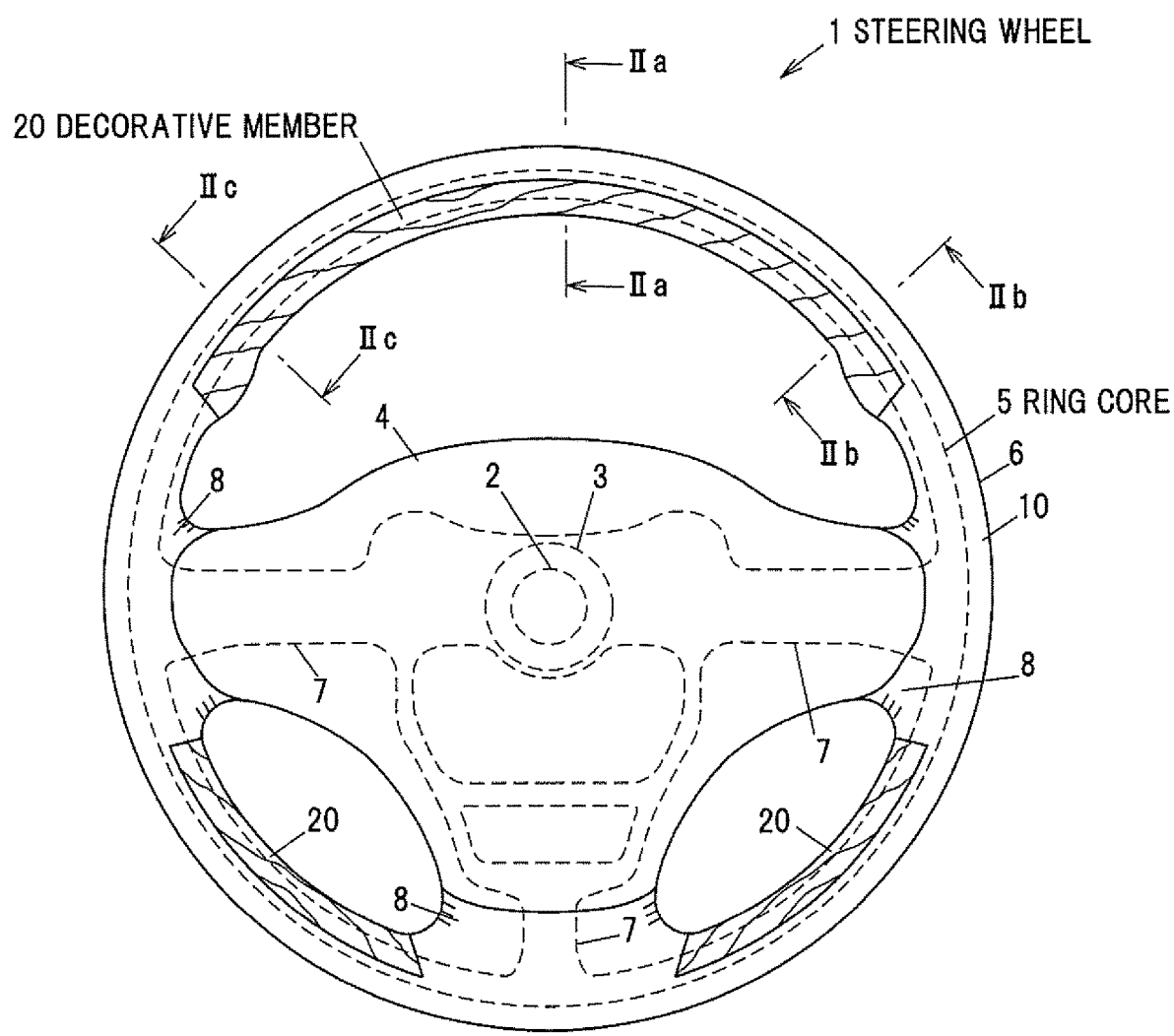
FIG. 1 is a schematic plan view illustrating an example of a steering wheel provided with a decorative member according to a preferable first embodiment of the invention.

FIG. 1 schematically illustrates the entirety of an automobile steering wheel provided with a typical decorative member 20 according to the first embodiment. In FIG. 1, the reference sign 1 indicates the entirety of this steering wheel. Note that, in the following description, a front surface of the steering wheel 1 is referred to as a "front part", a back surface of the steering wheel 1 is referred to as a "back part", and the steering wheel 1 is referred to in terms of top, bottom, left, and right, as viewed from the front surface.

The steering wheel 1 illustrated in the drawings includes a cylindrical boss portion 3 fitted and fixed to the tip of a steering shaft 2, a pad portion 4 attached to an upper portion of the boss portion 3, a ring portion 6 encasing a ring core 5, and a spoke portion 8 encasing a portion of three spoke cores 7 that connect the ring core 5 and the boss portion 3 to each other.

Figure 2A:
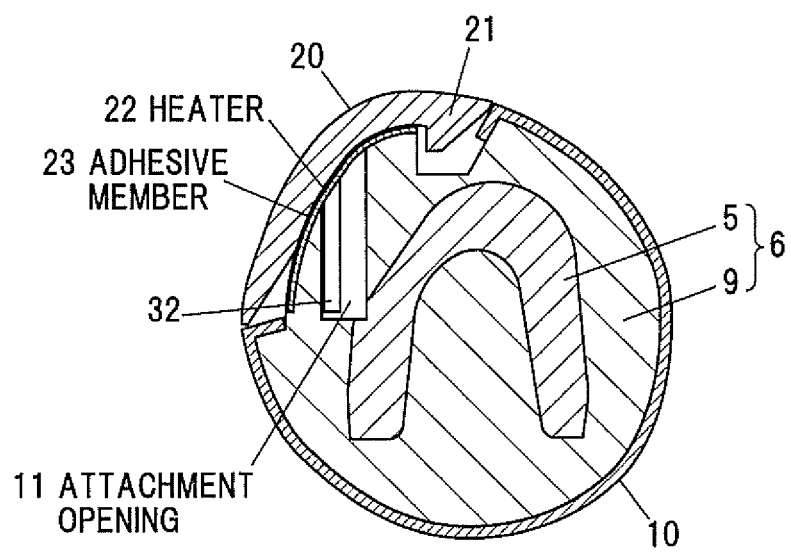
FIG. 2A is an enlarged main constituent cross-sectional view, as viewed in the direction of the arrows of line IIa-IIa of FIG. 1.
Figure 2B:
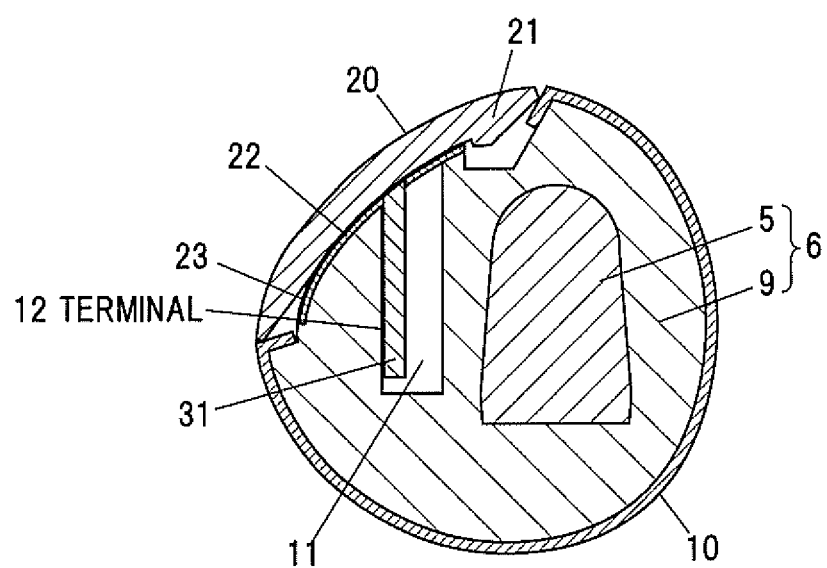
FIG. 2B is an enlarged main constituent cross-sectional view illustrating a cross-section viewed in the direction of the arrows of line IIb-IIb of FIG. 1 and a cross-section viewed in the direction of the arrows of line IIc-IIc of FIG. 1.

As illustrated in FIGS. 1, 2A, and 2B, a cover portion 9 made from a resin member such as polyurethane covers an outer circumferential portion of the ring portion 6 and an outer circumferential portion of the spoke portion 8. A surface of the cover portion 9 is covered by a skin portion 10 made from leather and a decorative member 20 including a design surface for enhancing the outward appearance design of the steering wheel 1.

Configuration of Decorative Member

The decorative member 20 illustrated in the drawings is composed of three members that are grip portions that a driver grips, namely a decorative member 20 on the top side, a decorative member 20 on the lower left side, and a decorative member 20 on the lower right side of the ring portion 6. As illustrated in FIG. 1, these decorative members 20 are attached to an inner circumferential side of the ring portion 6 of the steering wheel 1, but a configuration is possible in which these decorative members 20 are attached to an outer circumferential side of the ring portion 6.

Next, a description is given of the decorative member 20 on the top side of the ring portion 6, but the lower left side and lower right side decorative members 20 have the same shape and structure as the top side decorative member 20. Accordingly, detailed descriptions of the lower left and lower right decorative members 20 are omitted.

Figure 3:
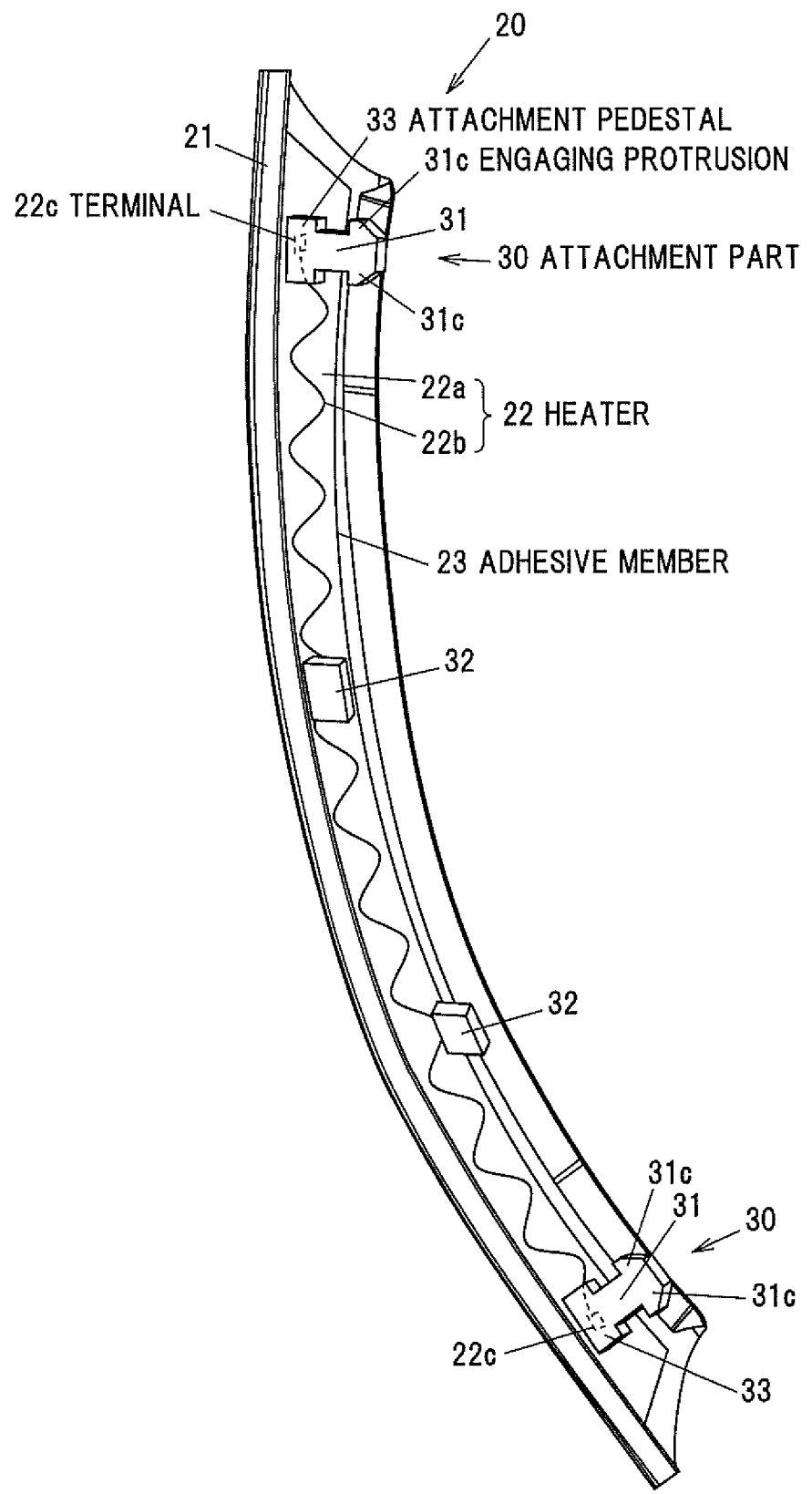
FIG. 3 is a perspective view schematically illustrating an example of the decorative member according to the first embodiment.

As illustrated in FIGS. 2A, 2B, and 3, the decorative member 20 includes a base member 21 constituting a design part to be provided on the front surface of the ring portion 6, and a heater 22 that heats and keeps the base member 21 warm.

The base member 21 is made from a wood material and is formed into a curved surface shape. The wood material is attached along the extending direction of the ring portion 6 and covers substantially a quadrant portion of the driver-side facing surface of the ring portion 6. Examples of the wood material include walnut material, maple material, and bamboo material.

A clear coat layer can be formed on the front surface of the base member 21 by applying a color clear coating and a clear coating to the front surface of the base member 21. The heater 22 is adhered to the back surface of the base member 21 by an adhesive member 23. Examples of the adhesive member 23 include hot melt sheets.

The heater 22 is a sheet-like heating element and is formed by sewing a heater wire 22b into a thermally conductive reinforcing material 22a made from a fiber sheet base material, for example. Nonwoven fabric, woven fabric, knitted fabric, and the like can be preferably used as the reinforcing material 22a. A variety of heater wires that generate heat when energized can be used as the heater wire 22b, and examples thereof include a heating wire formed by covering the surface of the core of nichrome wire with an insulating layer, and the like.

The heater wire 22b extends in an undulating manner along the extending direction of the base member 21. Both ends in the extending direction of the heater wire 22b are electrically connected to terminals 22c and 22c, which have different polarities. The terminals 22c of the heater wire 22b are electrically connected to a control circuit (not illustrated in the drawings), and are configured to generate heat when energized via the control circuit.

The base member 21 includes attachment parts 30 for fixing and holding the base member 21 to the ring portion 6. The attachment parts 30 include engaging fixing pieces 31, 31 on both sides in the extending direction that protrude from the back surface of the base member 21, and two protruding tabs 32, 32 that are positioned between the pair of engaging fixing pieces 31, 31 and protrude from the back surface of the base member 21.

Additionally, attachment openings 11 composed of engaging recesses or engaging holes, into which each of the engaging fixing pieces 31 and protruding tabs 32 is inserted and pressed into, are drilled in the corresponding ring portion 6.

With the attachment parts 30, the engaging fixing pieces 31 hook onto and engage with the attachment openings 11 in the ring portion 6, thereby preventing the attachment parts 30 from falling out in a detaching direction of the base member 21. Additionally, one of the protruding tabs 32 engages with one of the attachment openings 11 of the ring portion 6, thereby preventing the attachment parts 30 from moving in a direction orthogonal to the detaching direction of the base member 21. Due to the engaging fixing pieces 31 and the protruding tabs 32, the base member 21 can be easily fixed and held to the ring portion 6 in one action, without using fixing members such as screws.

Heater Energizing Connection Structure

A main feature of the decorative member 20 configured as described above is that a heater energizing connection structure for supplying current from a control circuit on the steering main body side to the heater 22 on the decorative body side is provided in the attachment parts 30 of the base member 21. This heater energizing connection structure is composed of the attachment parts 30, namely the engaging fixing pieces 31, and the attachment openings 11 in the ring portion 6.

Note that, as illustrated in FIG. 2B, which illustrates a similar main constituent cross-sectional view along lines IIb-IIb and IIc-IIc of FIG. 1, and as illustrated in FIG. 3, which illustrates the overall configuration of the decorative member 20, a first attachment part 30 and a second attachment part 30 have the same shape and structure, and only the polarities of the terminals 22c of the heater 22, which are electrically connected to the engaging fixing pieces 31, are different. Accordingly, in the following description, both depiction and description of one of the attachment parts 30 are omitted.

As illustrated in FIGS. 2B and 3, the engaging fixing piece 31 of the attachment parts 30 that attaches the base member 21 to the ring portion 6 is configured separately from the base member 21, and is made from an electrically conductive material that conducts current to the terminal 22c of the heater 22. Examples of the electrically conductive material include stainless steel and similar metal materials, but electrically conductive resin materials can be used as well.

Figure 4A:
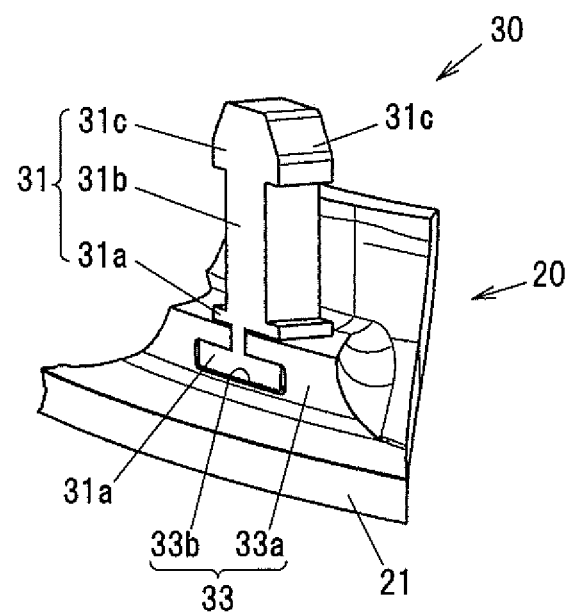
FIG. 4A is an enlarged main constituent perspective view schematically illustrating an attachment part of the decorative member.
Figure 4B:
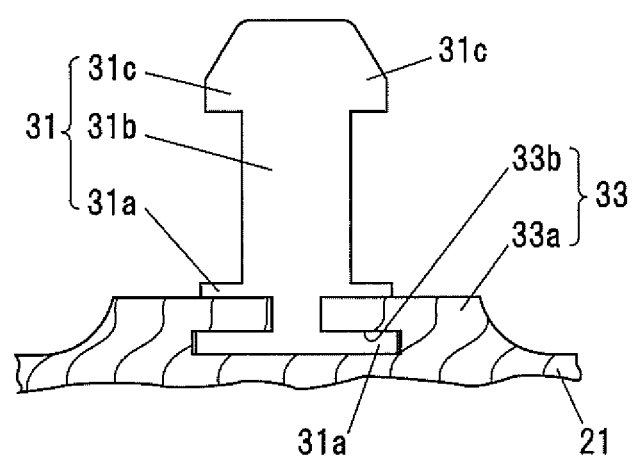
FIG. 4B is an enlarged main constituent side view.

As illustrated in FIGS. 4A and 4B, the engaging fixing piece 31 includes a substantially plate-shaped attachment shaft portion 31b that links two flanges 31a, 31a (herein referred to as a first engaging part) that spread sideways and are disposed at a predetermined spacing in an axial direction at a base end of the attachment shaft portion 31b with each other; and substantially trapezoidal plate-shaped engaging protrusions 31c, 31c (herein referred to as a second engaging part) that protrude sideways from a tip end of the attachment shaft portion 31b.

An attachment pedestal 33 for attaching the engaging fixing piece 31 is formed in a bulging manner on the back surface of the base member 21. This attachment pedestal 33 has a substantially rectangular box shape with an open wall portion 33a opened in one side thereof. An engagement hole 33b is drilled in a center of the open wall portion 33a, and the space between the engagement hole 33b and the open wall portion 33a is cut out. By inserting the attachment shaft portion 31b of the engaging fixing piece 31 into the engagement hole 33b, the surrounding portions of the engagement hole 33b are sandwiched and secured between the flanges 31a of the attachment shaft portion 31b.

A configuration is possible in which the terminal 22c of the heater 22 is electrically connected to the attachment part 30 by inserting the attachment shaft portion 31b of the engaging fixing piece 31 into the engagement hole 33b of the attachment pedestal 33, thereby causing the flanges 31a of the attachment shaft portion 31b to contact the terminal 22c of the heater 22 and form an electrical connection.

Note that the electrical connection between the terminal 22c of the heater 22 and the attachment part 30 is not limited to the connection formed by inserting the engaging fixing piece 31. For example, means such as caulking, soldering, wire bonding, and the like can be appropriately selected and used.

As illustrated in FIG. 2B, a power supply side terminal 12 that is electrically connected to a control circuit that performs ON/OFF control of the energization of the heater 22 is built into the corresponding attachment opening 11 in the ring portion 6. When the engaging fixing piece 31 of the attachment part 30 is inserted into the attachment opening 11 in the ring portion 6, the base member 21 is fixed and held to the ring portion 6 and an electrical connection is formed between the terminal 22c of the heater wire 22b and the power supply side terminal 12 in one action.

According to the heater energizing connection structure configured as described above, the engaging fixing piece 31 of the attachment part 30 is configured as an electrical connector that electrically connects to the terminal 22c of the heater wire 22b and also contacts the power supply side terminal 12 of the ring portion 6 to form an electrical connection. As such, a decorative member 20 can be fabricated in which the energization of the heater 22 can be controlled by a control circuit.

Modified Examples of Attachment Part

In order to achieve remarkable operational effects of the attachment part 30 of the base member 21, it is preferable that the shape, structure, and the like of the attachment part 30 be appropriately selected. Another example of the attachment part 30 of the base member 21 is described while referencing FIG. 5.

Figure 5:
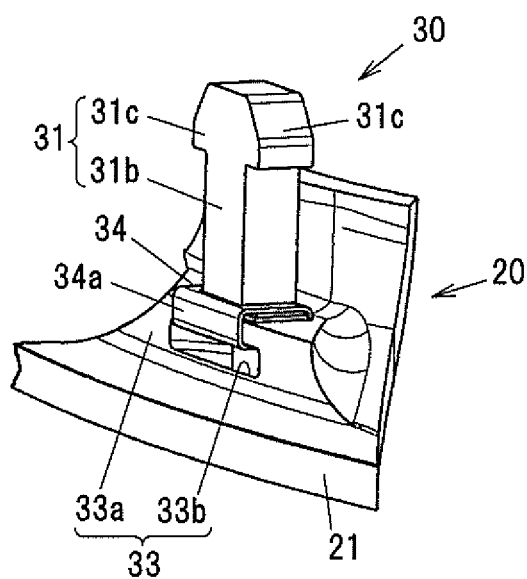
FIG. 5 is an enlarged main constituent perspective view schematically illustrating another example of the attachment part of the decorative member.

In FIG. 5, instead of the two flanges 31a formed on the base end of the attachment shaft portion 31b of the engaging fixing piece 31 of the attachment part 30, an elastic clip 34, having a folded shape obtained by folding one sheet of electrically conductive metal plate material a plurality of times, is formed on the base end of the attachment shaft portion 31b. The elastic clip 34 includes a substantially U-shaped mating portion 34a that enables elastic deformation, which fixes to the attachment pedestal 33 of the base member 21.

The mating portion 34a of the elastic clip 34 is fixed to the attachment pedestal 33 by being inserted into the open wall portion 33a of the attachment pedestal 33, and contacts and is electrically connected to the terminal 22c of the heater 22. When the elastic clip 34 is inserted into the attachment opening 11 in the ring portion 6, the base member 21 is fixed and held to the ring portion 6 and the elastic clip 34 contacts the power supply side terminal 12 of the attachment opening 11 in the ring portion 6. Thus, an electrical connection between the terminal 22c of the heater wire 22b and the power supply side terminal 12 of the ring portion 6 is formed in one action.

Figure 6:
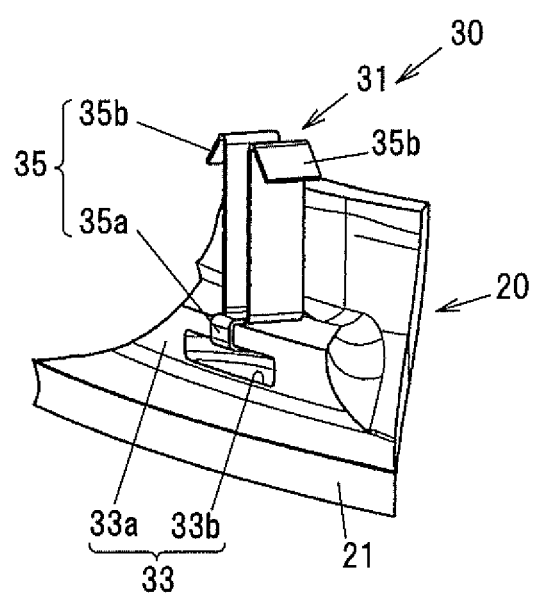
FIG. 6 is an enlarged main constituent perspective view schematically illustrating yet another example of the attachment part of the decorative member.

Next, yet another example of the attachment part 30 of the base member 21 is illustrated while referencing FIG. 6. With the engaging fixing piece 31 of the attachment part 30 illustrated in FIG. 6, the attachment shaft portion 31b is configured as a single metal spring member.

This metal spring member is made from an elastic clip 35 including a substantially U-shaped body portion 35a obtained by folding one sheet of electrically conductive metal plate material, and a pair of elastic engagement tabs 35b, 35b obtained by folding both the left and right edges of the body portion 35a. The elastic engagement tabs 35b are formed by bending an elongated plate-like electrically conductive metal into a predetermined shape so as to have springiness.

The body portion 35a of the elastic clip 35 is fixed to the attachment pedestal 33 of the base member 21 by being inserted into the open wall portion 33a of the attachment pedestal 33, and contacts and is electrically connected to the terminal 22c of the heater 22.

By inserting the pair of elastic engagement tabs 35b of the elastic clip 35 into the attachment opening 11 in the ring portion 6, the base member 21 is fixed and held to the ring portion 6 and the elastic clip 35 contacts the power supply side terminal 12 of the attachment opening 11 in the ring portion 6. Thus, the electrical connection between the terminal 22c of the heater wire 22b and the power supply side terminal 12 of the ring portion 6 is formed in one action.

Effects

With the steering wheel decorative member 20 according to the first embodiment and the modified examples configured as described above, the following effects are obtained in addition to the effects described above.

It is possible to electrically connect the terminal 22c of the heater wire 22b to the power supply side terminal 12 of the attachment opening 11 in the ring portion 6 in one action by inserting and fixing the engaging fixing piece 31 of the attachment part 30 of the base member 21 into the attachment opening 11 in the ring portion 6. As such, the ease of assembly when electrically connecting the heater wire 22b can be enhanced and the ease of wiring work of the heater wire 22b can be enhanced.

Moreover, there is no need to lay lead wires in the gap portion between the skin portion 10 and the base member 21. As such, the work of graining the folded end portions of the skin portion 10 is facilitated and work efficiency can be increased.

It is possible to prevent bending and breaking of the heater wire 22b due to wrinkles in the skin portion 10 or the reinforcing material 22a because there is no need to route lead wires. As a result, the durability of the heater 22 can be enhanced.

The energizing connection structure of the heater 22 is obtained due to the attachment part 30 of the base member 21 and, as such, the folded end portions of the skin portion 10 can be securely fixed, the transition between the skin portion 10 and the base member 21 can be nicely finished, and the quality of the product can be enhanced.

Second Embodiment

Figure 7:
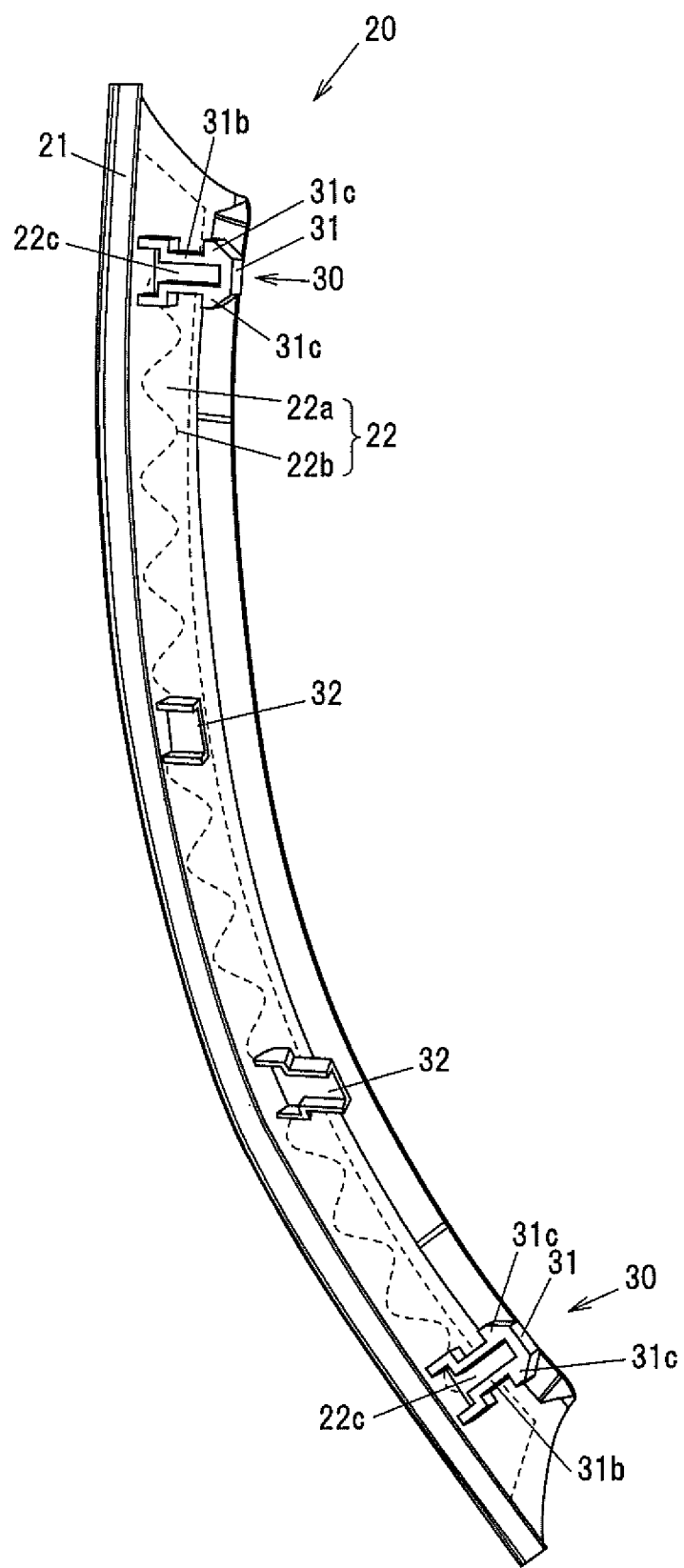
FIG. 7 is a perspective view schematically illustrating an example of a decorative member according to a second embodiment.

Next, an example of a steering wheel decorative member 20 according to a second embodiment is schematically illustrated while referencing FIG. 7. Note that in this drawing, members that are substantially the same as those described in the first embodiment are referred to by the same names and indicated using the same reference signs. Accordingly, detailed descriptions of such members are omitted.

The second embodiment differs from the first embodiment in that, in the first embodiment, the engaging fixing piece 31 of the attachment part 30 is configured separately from the base member 21 while, in the second embodiment, the engaging fixing piece 31 of the attachment part 30 is integrated with the base member 21.

In FIG. 7, the terminals 22c and the heater 22 are inserted in advance into an injection mold and molten resin that becomes the base member 21 is then injected into the mold. As a result, a molded body can be obtained in which the engaging fixing piece 31 of the base member 21 is integrally molded with the terminals 22c of the heater 22. A material of the base member 21 is not particularly limited and, for example, various types of resin materials can be used. From the perspective of enhancing the exterior design, the surface of the resin material is preferably decorated with a wood grain pattern or the like.

The engaging fixing piece 31 of the attachment part 30 includes a substantially plate-shaped attachment shaft portion 31b extending in the axial direction at the base end thereof; and substantially trapezoidal plate-shaped engaging protrusions 31c, 31c that protrude sideways from a tip end of the attachment shaft portion 31b. The terminal 22c of the heater 22 is formed in the attachment shaft portion 31b of the engaging fixing piece 31 as an electrical connector, and is exposed.

When the attachment part 30 of the base member 21 is inserted into the attachment opening 11 in the ring portion 6, the engaging fixing piece 31 of the attachment part 30 is fixed to and held in the attachment opening 11 in the ring portion 6, and the terminal 22c of the heater wire 22b contacts the power supply side terminal 12 of the attachment opening 11 in the ring portion 6. Thus, an electrical connection between the terminal 22c of the heater wire 22b and the power supply side terminal 12 is formed in one action.

The configuration of the steering wheel decorative member 20 is not limited to the example illustrated in the drawing and any configuration may be used, provided that the base member 21 and the engaging fixing piece 31 are integrally molded. For example, a configuration is possible in which the heater 22 is not inserted but, rather, is adhered to the back surface of the base member 21, which is integrally molded with the engaging fixing piece 31, by an adhesive member 23.

By applying or printing an electrode film on the engaging fixing piece 31 of the attachment part 30 via metal plating, deposition, sputtering, or a conductive paste, an electrical connection between the engaging fixing piece 31 and the terminal 22c of the heater wire 22b can be formed by appropriately selecting means such as caulking, soldering, and wire bonding. Typical electrically conductive materials such as gold, silver, copper, aluminum, and other metals can be used as the electrode film.

With this configuration as well, when the engaging fixing piece 31 of the attachment part 30 of the base member 21 is inserted into the attachment opening 11 in the ring portion 6, the engaging fixing piece 31 is fixed and held to the attachment opening 11, and an electrical connection between the terminal 22c of the heater wire 22b and the power supply side terminal 12 of the attachment opening 11 in the ring portion 6 can be formed in one action.

Effects

With the steering wheel decorative member 20 according to the second embodiment and the modified examples configured as described above, the following effects are obtained in addition to the effects described above in the first embodiment.

There is no need to provide the shape and structure of the base member 21 as described in the first embodiment. As a result, it is possible to mold a decorative member 20 having a new shape and structure by simply providing the heater 22 including the terminals 22c.

Descriptions have been given of exemplary configurations of the steering wheel decorative member 20 using embodiments, modified examples, and drawings. However, in addition, the following modified examples are possible. Note that, in these cases as well, the same effects as described above can be obtained.

The decorative member 20 may include a base member 21 having a configuration including a veneer constituting a design part made from a single sheet obtained by shaving natural wood to a desired thickness, a base material that functions as a fixing portion of the veneer to the ring portion 6, and a heater 22 adhered between the veneer and the base material by an adhesive member 23. The decorative member 20 having such a configuration includes the attachment part 30, which is electrically connected to the terminal 22c of the heater 22, on the back surface of the base material. Resin materials such as polyamide resin, wood-based materials, for example, can be used as the base material.

In the representative embodiments and examples of the steering wheel decorative member 20 according to the invention, a case is described where the decorative member is applied to an automobile. However, the invention is not limited thereto and can of course be effectively applied to various types of work vehicles such as construction machinery, and agricultural machinery.

As made clear above, the invention according to the scope of the claims is not limited by the representative embodiments, modified examples, and illustrated examples of the invention described above. As such, it should be understood that all combinations of the features described in the embodiments, modified examples, and illustrated examples are not required parts of the means to solve the problems of the invention.

What is claimed is:

1. A steering wheel decorative member that is configured to be attached corresponding to a resin member covering a periphery of a ring core of a steering wheel, the decorative member comprising:
   a base member constituting a design part;
   a heater having a terminal provided on a back surface of the base member; and
   an attachment part that is configured to attach the base member to the resin member,
      wherein the terminal of the heater is electrically connected through the attachment part to a power supply side terminal provided in the resin member.

2. The steering wheel decorative member according to claim 1, wherein the attachment part comprises an engaging fixing piece that, at a first end side thereof, is electrically connected to the terminal of the heater and that, at a second end side thereof, protrudes from the back surface of the base member and is electrically connected to the power supply side terminal.

3. The steering wheel decorative member according to claim 2, wherein the engaging fixing piece comprises an electrically conductive material.

4. The steering wheel decorative member according to claim 1, wherein the power supply side terminal is provided in an attachment opening into which the attachment part is inserted and pushed.

5. The steering wheel decorative member according to claim 2, wherein the engaging fixing piece is formed separate from the base member and comprises an electrically conductive material.

6. The steering wheel decorative member according to claim 2, wherein the engaging fixing piece is formed separate from the base member, and comprises a first engaging part that engages with the base member at the first end side, and an electrically conductive material.

7. The steering wheel decorative member according to claim 2, wherein the engaging fixing piece is formed separate from the base member, and comprises a first engaging part that engages with the base member at the first end side, a second engaging part that engages with the resin member at the second end side, and an electrically conductive material.

8. A steering wheel decorative member that is configured to be attached corresponding to a resin member covering a periphery of a ring core of a steering wheel, the decorative member comprising:
- a base member constituting a design part;
- a heater having a terminal provided on a back surface of the base member; and
- an attachment part that is configured to attach the base member to the resin member, the attachment part comprising an electrically conductive metal material at a base end thereof,
- wherein the terminal of the heater is electrically connected through the attachment part to a power supply side terminal provided in the resin member.

* * * * *